(12) United States Patent
Sullivan

(10) Patent No.: US 6,944,248 B2
(45) Date of Patent: Sep. 13, 2005

(54) DATA RATE CALIBRATION FOR ASYNCHRONOUS SERIAL COMMUNICATIONS

(75) Inventor: Terence Sean Sullivan, Brookline, MA (US)

(73) Assignee: Bluebrook Associates LLC, Cambridge, MA (US)

( * ) Notice: Subject to any disclaimer, the term of this patent is extended or adjusted under 35 U.S.C. 154(b) by 809 days.

(21) Appl. No.: 09/860,229

(22) Filed: May 17, 2001

(65) Prior Publication Data

US 2002/0172315 A1 Nov. 21, 2002

(51) Int. Cl.[7] .............................................. H04L 25/38
(52) U.S. Cl. ...................................... 375/369; 375/225
(58) Field of Search ................................ 375/369, 225, 375/254

(56) References Cited

U.S. PATENT DOCUMENTS

| | | | |
|---|---|---|---|
| 4,208,650 A | * | 6/1980 | Horn .......................... 714/798 |
| 4,761,763 A | | 8/1988 | Hicks et al. |
| 4,761,800 A | | 8/1988 | Lese et al. |
| 5,008,902 A | | 4/1991 | Key et al. |
| 5,072,407 A | | 12/1991 | Gutz et al. |
| 5,359,605 A | | 10/1994 | Urbansky et al. |
| 5,490,209 A | | 2/1996 | Kennedy et al. |
| 5,635,911 A | * | 6/1997 | Landers et al. .............. 340/674 |
| 5,654,983 A | | 8/1997 | Sauser |
| 5,956,648 A | | 9/1999 | Brennan et al. |
| 6,157,689 A | | 12/2000 | Petty et al. |
| 6,163,586 A | | 12/2000 | Hongbin Hao et al. |
| 6,198,785 B1 | | 3/2001 | Flynn |
| 6,704,350 B1 | * | 3/2004 | Ryu et al. .................... 375/222 |

* cited by examiner

*Primary Examiner*—Stephen Chin
*Assistant Examiner*—Harry Vartanian

(57) ABSTRACT

A method and apparatus for determining the appropriate timing interval for each bit or data symbol in serial data communications. A sending device transmits a predetermined bit sequence, such as a binary pattern corresponding to one byte, either on its own initiative or in response to an action of a receiving device. A microprocessor in the receiving device measures a calibration time interval between the leading edge of a start bit and a subsequent marker transition, either between subsequent data bits or between the final data bit and the stop bit. This measured interval may be mathematically converted to units useful to calibrate a function or device that conducts input/output operations. Optionally, the process may be repeated periodically to compensate for clock rate drift. This invention may be used for autobaud data rate detection, or matching the actual data rate of a remote serial device, and permits accurate communications without precision timing references.

20 Claims, 4 Drawing Sheets

DATA RATE CALIBRATION FOR ASYNCHRONOUS SERIAL COMMUNICATIONS

FIELD OF THE INVENTION

This invention relates to serial data communications, specifically to an improved technique for automatically calibrating a timing parameter affecting the data rate of asynchronous serial communications.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Asynchronous serial data communication is a common method for sending data between electronic devices. Examples of devices employing asynchronous serial data communications include computers, Global Positioning System ("GPS") navigation units, and telecommunications radio receivers. Asynchronous serial data communications systems employ two or more "symbols", or recognizable states of the data line, and convey one or more bits of binary data with each symbol.

In a common asynchronous serial data format used to transmit binary data, two data symbol values are used, corresponding to a data line held at one of two levels ("high" and "low"). During idle periods, the data line is held at a specific level, which may be either high or low according to the convention of the system. To indicate the start of a data sequence, a "start bit" is transmitted with the opposite level. A fixed number of data bits follow, usually eight bits from least significant bit ("LSB", bit 0) to most significant bit ("MSB", bit 7), with the two data levels (high and low) mapped to the two bit values (one and zero) according to the convention of the system. Following bit 7, a final "stop bit" is sent with a level equal to the idle level. The level for each of bit, including the start and stop bits, is held on the data line for an identical time interval t. The receiving device should sample the data line near times 1.5 t, 2.5 t, 3.5 t . . . 8.5 t after the leading edge of the start bit. The interval t must be known precisely, because the receiving device must identify sample times without any time markers after the leading edge of the start bit. To ensure that the data rates used by the sending and receiving devices agree, prior art devices participating in such communications require precision timing references, such as crystal oscillators.

Asynchronous serial data is usually transmitted at one of a standard set of data rates, with each bit held for an interval such as $\frac{1}{2400}$ second, $\frac{1}{4800}$ second, $\frac{1}{9600}$ second, etc. Thus, in addition to having a precision timing reference, the receiving device must know the data rate employed by the sending device. In some prior art, the sending and receiving devices operate at a fixed data rate. In other prior art, often known as "autobaud", a receiving device can automatically discriminate among the standard set of data rates, to identify and match the data rate employed by a sending device.

Many known autobaud techniques, such as U.S. Pat. No. 6,198,785 to Flynn (2001) and U.S. Pat. No. 6,157,689 to Petty et al (2000), require a measurement of the exact duration of the start bit, and therefore require an observational timing capacity with high temporal resolution. U.S. Pat. No. 6,163,586 to Hongbin Hao et al (2000) requires that a remote sending device transmit a very specific sequence of characters, and then discriminates among a standard set of expected data rates. Thus, it lacks the capacity of intermediate calibration adjustments to the effective data rate, to compensate for an imprecise timing reference at either the sending or receiving device. U.S. Pat. No. 5,008,902 to Key et al (1991), and U.S. Pat. No. 5,072,407 to Gutz et al (1991), test a standard set of expected data rates that differ by a fixed multiplier, and like U.S. Pat. No. 6,163,586, cannot make intermediate calibration adjustments to the effective data rate. U.S. Pat. No. 5,490,209 to Kennedy et al (1996) performs a series of true/false tests for expected standard baud rates, and is limited to testing for a single hypothesized data rate per received character.

SUMMARY OF THE INVENTION

The present invention may be used by a device receiving asynchronous serial communications to match the apparent data rate used by the device sending these communications. The apparent duration of a calibration time interval is measured between the leading edge of a start bit and a marker transition at the end of a subsequent data symbol. This timing measurement is then used to calibrate serial communications means, so that subsequent asynchronous serial communications are conducted at the observed data rate.

In one aspect, the present invention comprises the steps of:

a) detecting a start bit leading edge preceding a predetermined data pattern;

b) detecting a marker transition at the end of a subsequent data symbol;

c) determining a measured calibration time interval between said start bit leading edge and said marker transition, indicating said apparent data rate;

d) determining a calibration parameter for an asynchronous serial communications means, for bringing the data rate of communications conducted thereby to about said apparent data rate, and e) providing said calibration parameter to said asynchronous serial communications means, whereby said asynchronous serial communications means are calibrated for subsequent asynchronous serial data communications.

Further aspects of the present invention are described in the detailed description and alternative embodiments that follow.

Accordingly, several objects and advantages of the present invention are:

a) to reduce the cost and complexity of electrical circuits in devices employing asynchronous serial data communications, by eliminating the need for precision timing components;

b) to enable asynchronous serial data communications with devices employing imprecise timing reference components;

c) to compensate for the drift of unstable timing components utilized in electrical circuits or devices employing asynchronous serial data communications;

d) to determine the data rate of a received asynchronous serial data communication, and e) to determine a calibration parameter for input/output means, bringing subsequent asynchronous serial data communications to an observed data rate.

Further objects and advantages will become apparent from a consideration of the drawings and ensuing description.

REFERENCE NUMERALS IN THE DRAWINGS

Figure 1:
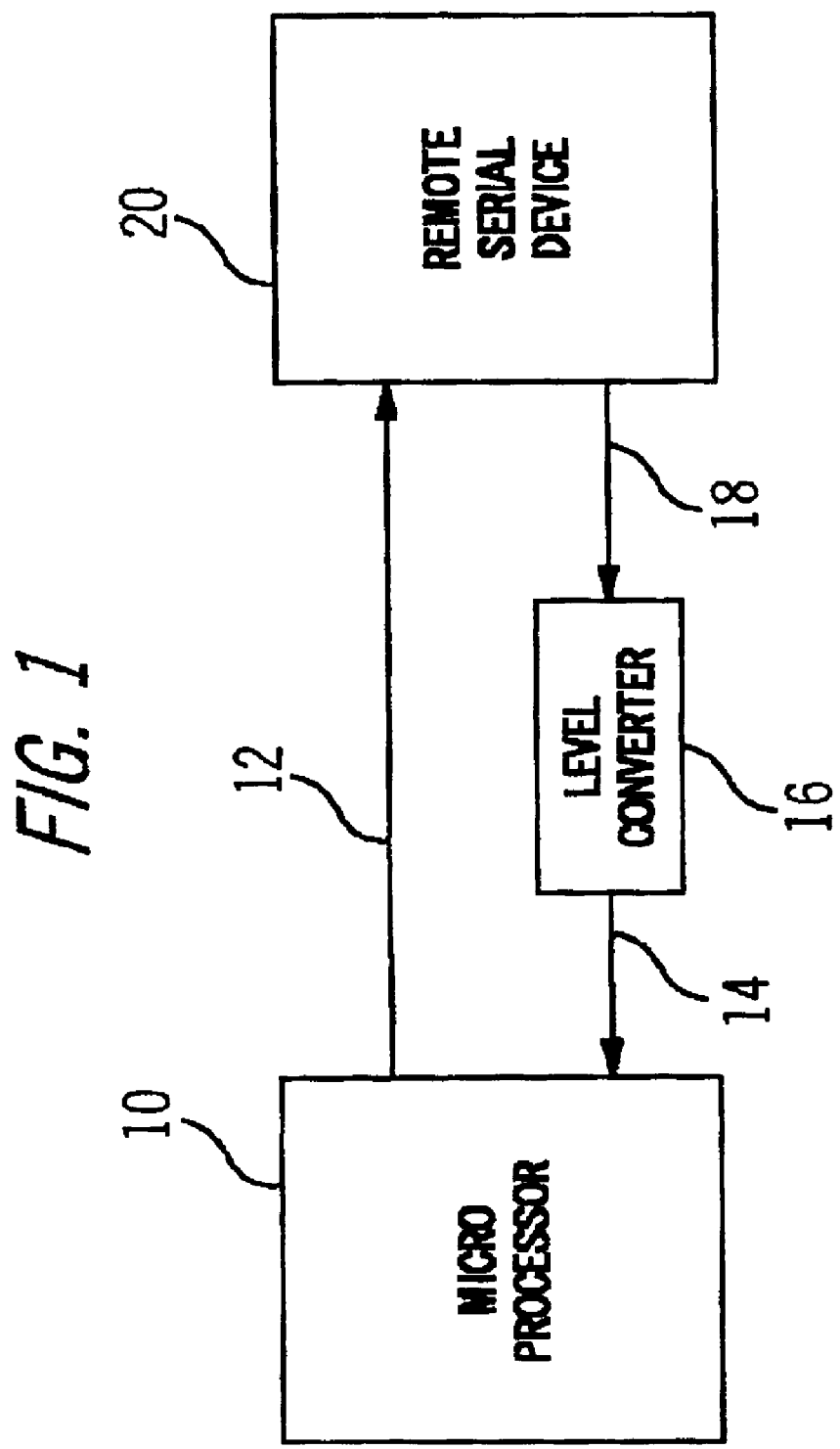
FIG. 1 is a block diagram of a data communications apparatus, according to a preferred embodiment of the invention.

10 Microprocessor
12 Communications link (logic level microprocessor output)
14 Communications link (logic level microprocessor input)
16 Level converter
18 Communications link (from remote serial device)
20 Remote serial device
30 Start bit leading edge
32 Window midpoint
34 Marker transition
38 Postmarker symbol
40 Calibration time interval
42 Window interval
50 Send unintelligible command
52 Check communications line to verify idle level
54 Clear timeout counter
60 Check communications line for start bit leading edge
62 Increment timeout counter
64 Check timeout counter for timeout
70 Clear timing metric counter
72 Increment timing metric counter
74 Check timing metric counter for estimated window midpoint
78 Clear free-running counter
80 Increment timing metric counter
82 Check timing metric counter for unreasonable value
84 Check communications line for marker transition
90 Verify that timing metric counter has reasonable value
92 Store timing metric counter as i/o calibration parameter

DETAILED DESCRIPTION OF THE INVENTION

The present invention provides methods and apparatus for matching an apparent data rate in an asynchronous serial data communication.

FIG. 1 shows a block diagram of a data communications apparatus, according to a preferred embodiment of the invention. In this embodiment, an output port of microprocessor 10 is connected via communications link 12 to an input port of remote serial device 20. An output port of remote serial device 20 is connected via communications link 18 to an input of level converter 16, and an output of level converter 16 is connected via communications link 14 to an input port of microprocessor 10.

Microprocessor 10 may be, in a non-limiting example, a PIC12C508 microprocessor commercially available from Microchip Technology of Chandler, Ariz.

In conventional designs, microprocessor 10 would require an additional component or electrical circuit providing a precision timing reference, such as a crystal oscillator. Asynchronous serial communications are not possible if the data rates used by the sending and receiving devices differ by more than about five percent, and sufficient accuracy is usually achieved by supplying each device with a stable precision timing reference. However, when the present invention is employed, such a reference is not required.

In the preferred embodiment, the exemplary microprocessor 10 PIC12C508 is used in a standard configuration where the PIC12C508 generates its own clock from an on-chip RC oscillator. This is an imprecise timing reference requiring no additional components, with clock rate errors that may be greater than ten percent, and instability under extreme temperature swings of several percent.

Remote serial device 20 may be any device that generates asynchronous serial data communications according to a known protocol. A non-limiting example used to illustrate this embodiment is a Uniden BC-780XLT telecommunications receiver commercially available from Uniden America Corporation of Fort Worth, Tex.

In the preferred embodiment, level converter 16 comprises a 22 k resistor, although other resistor values or a more sophisticated level converter circuit may be employed. In the preferred embodiment, communications links 12, 14, and 18 are cables or wires, although other ordinary signal transmission elements such as telephone lines may be employed.

In the preferred embodiment, the exemplary PIC12C508 microprocessor 10 is programmed with on-chip embedded firmware to actualize and utilize, in combination with the standard hardware of the PIC12C508, means including: an input port connected to communications link 14 for receiving signals from remote serial device 20; an output port connected to communications link 12 for sending signals to remote serial device 20; port change detection means for detecting changes in level at the input port ("transitions"); timing means for measuring an interval between events in relation to a clock timing reference; and calibration means for adjusting the data rate of asynchronous serial communication means implemented as embedded firmware within the PIC12C508.

The following is a source code listing for the implementation of the present invention, in a preferred embodiment. The source code is in the Microchip Technology native assembly language for the PIC12C508 microprocessor, and is written to be portable to most current microprocessors in the PIC series. Although asynchronous serial communications functions are well known to people skilled in the art, exemplary source code for these functions are also included in the source code to illustrate the usage of the calibration timing parameter obtained by the present invention.

Source Code Listing

```
; Exemplary code for preferred embodiment using PIC12C508

MAXSTR      EQU     D'9'        ; Bytes allocated to STRING
DEFCAL      EQU     D'104'      ; Default calibration (1 mips / 9600 baud)
CAL_TO      EQU     D'82'       ; Default wait period during calibration
                                ; This marker tran - use (5.5/7)*DEFCAL
CAL_LIM     EQU     D'127'      ; Default max period for finding marker
                                ; transition in calib, (8.5/7)*DEFCAL org H'10'

ALPHA       RES 1   ; 10H       General purpose scratch register
BETA        RES 1   ; 11H       General purpose scratch register
GAMMA       RES 1   ; 12H       General purpose scratch register
DELTA       RES 1   ; 13H       General purpose scratch register
BOOL        RES 1   ; 14H       Boolean register (bitwise allocation)
IOCAL       RES 1   ; 15H       Asynch serial i/o data rate calibration
STRLEN      RES 1   ; 16H       Number of valid bytes in STRING array
STRING      RES 9   ; 17H-1FH   STRING array of character bytes define PIN_HI   BOOL, 0
define CAL_SUC  BOOL, 1
#define INPORT   GPIO, 2
#define OUTPORT  GPIO, 4

; All instructions used on the PIC12C508 take the same
                ; time (one instruction cycle) except instructions
                ; affecting program counter, which take twice as long.

movlw DEFCAL    ; Initialize calibration parameter
                movwf IOCAL     ; to reasonable default for 9600 baud ; Standard PIC12C508 configuration required (TRIS,
                ; OSCCAL registers, etc), and other user-specific
                ; programming. "goto" an initialization address.

org H'90'

; Insert next 5 lines into main program code to
                ; calibrate. Placed outside "Calib" to accommodate
                ; limited stack of PIC12C508 microprocessor.
```

```
Get_Calib      movlw D'13'         ; Step 50: Trigger an "ERR" (error)
               movwf STRING        ; response from exemplary Uniden
               movlw D'1'          ; BC-780XLT by sending an unintelligible
               movwf STRLEN        ; command (carriage return)
               call StrOut         ; Send it.
               call Calib          ; Obtain calibration parameter
Done           goto Done           ; --- Calibration complete. Ordinary
                                   ; program code would follow, and
                                   ; conduct further i/o based on the
                                   ; calibration parameter obtained.

Calib                              ; ----------------------------------------
                                   ; Data rate calibration matching remote device ; Input:   IOCAL is estimate of the number of PIC
                                   ;          instructions per data symbol (bit)
                                   ; Output:  IOCAL is calibrated value (same units)
                                   ; Affects: ALPHA, BETA, GAMMA, W ; General operation: Watch for an expected "E".
                                   ; Count instructions from start bit leading edge
                                   ; to a subsequent transition that is easy to
                                   ; detect, even with a significant IOCAL error.
                                   ; The timing metric counter is incremented every
                                   ; 7 instructions over a 7-bit interval, resulting
                                   ; in a value that is in "instructions per bit".

; This code is set for an estimated 9600 baud
                                   ; datastream using clamped RS-232 levels, where
                                   ; a logic LOW = bit value 1, logic HIGH = bit value 0.

bcf CAL_SUC         ; Default report no calibration btfsc INPORT        ; Step 52: Verify level
               return              ; consistent with idle state clrf BETA           ; Step 54: BETA:ALPHA is a
               clrf ALPHA          ; timeout counter ; ----------------------------------------
                                   ; Watch for start bit leading edge
```

```
L_Start              ; Checks for start bit about every 5 instructions.

btfsc INPORT         ; Step 60:  Start bit?
           goto L_Found         ;    ... if so, start timing.

incfsz ALPHA, F      ; Step 62: (Inner loop)
           goto L_Start         ; Advance timeout counter.

; Step 62/64: increment part of 62, skip-if-zero 64.

incfsz BETA, F       ; (Outer loop)
           goto L_Start         ; Timeout is about 1/3 second return               ; Error exit -- no "E".

L_Found              ; -----------------------------------------
                     ; Note 5 instruction loop at L_Start, so average
                     ; start bit detection is +2.5 instructions after the
                     ; true leading edge.  Test/Jump adds +3 instructions.
                     ; At L_Found entry, we average +5.5 instructions
                     ; after the true start bit leading edge.

clrf GAMMA           ; Step 70:  Clear timing metric counter

; The first increment below (GAMMA = 1) falls at an
           ; average +7.5 instructions after the true start bit
           ; leading edge.  GAMMA is advanced every 7 instructions.
           ; Port test performed midway between GAMMA increments ; Wait through first portion of byte.  Emerge about
           ; midway through 3-bit 000 sequence near window midpoint L_Wait     nop                  ; Step 72: GAMMA holds count of
           incf GAMMA, F        ; 7-instruction cycles completed movlw CAL_TO         ; Step 74: Predetermined exit value
           subwf GAMMA, W       ; Blind estimate of window midpoint
           btfss STATUS, Z      ; If we think we're not there yet ...
           goto L_Wait          ; ... keep looping and timing.

nop                  ; When dropping through, equivalent
                                ; in timing to the 2nd instruction
                                ; cycle consumed when "goto" executes
```

```
           ; ---------------------------------------------------
           ; Watch for 0->1 transition at end of this long 000
           ; block. This "marker transition" marks an instant
           ; exactly 7 bit-intervals after start bit leading edge.

L_Edge     nop              ; Step 80: GAMMA holds count of
           incf GAMMA, F    ; 7-instruction cycles completed btfsc STATUS, Z  ; Step 82: GAMMA unreasonable?
           return           ;   ... if so, error exit.
           btfsc INPORT     ; Step 84: Marker transition?
           goto L_Edge      ;   ... if not, keep watch.

; ---------------------------------------------------
           ; Marker transition seen. Analyze timing result.

movlw CAL_LIM    ; Step 90: Test for unreasonable result
           subwf GAMMA, W   ; Is GAMMA unreasonably large?
           btfsc STATUS, C  ; If so ...
           return           ;   ... error exit.

; Note: GAMMA cannot be unreasonably low. Smallest
           ; reasonable value is selected as exit from 72-74 loop movf GAMMA, W    ; Step 92: Get timing (inst per bit)
           movwf IOCAL      ;   ... and store as timing calibration
           bsf CAL_SUC      ; Report calibration successful return ; NOTE: Remainder of exemplary code is an illustrative
           ; asynchronous serial communications process showing an
           ; example use of the obtained calibration parameter.

BitPort    ; ---------------------------------------------------
           ; Copy CF (carry flag) to OUTPORT serial output port ; Input is carry flag. Affects W. Assumes valid
           ; data rate calibration in IOCAL, and data levels
           ; where 0 is expressed as a high logic level on the
           ; pin, and 1 is expressed as a low logic level.
```

```
; Timing is critical in this function.  "call BitPort"
; takes exactly (IOCAL - 4) instructions, including
; the "call" instruction itself.

; Step 1: Branch depending on desired pin level.

btfss STATUS, C    ; Drop through if port should be low
        goto F_One         ; Jump if port should be high ; Step 2: Set pin - while maintaining the same number
;         of instruction cycles over each path (0/1)

nop                ; Even timing with port=high branch
        bcf OUTPORT        ; Set serial output pin to 0 (low)
        goto F_Wait        ; (3 lines in PORT = LOW program path)

F_One   bsf OUTPORT        ; Set serial output pin to 1 (high)
        nop                ; (3 lines in PORT = HIGH program path)
        nop                ; Even timing with port=low branch F_Wait  ; Step 3: Wait until correct duration has expired.
        ;         (correct duration is just short of 1 bit)

; 8 instruction clocks executed to this point (2 in
; "call" + 6 in BitPort function). Excepting "goto
; Delay" below, 4 more clocks will be consumed in
; this function. Thus, "call BitPort" will use
; 12 + "goto Delay" charge. Goal is IOCAL - 4.
; Thus, delay charge should be (IOCAL - 16).

movlw D'16'        ; Delay of (IOCAL-16) instructions
        subwf IOCAL, W     ; Note use of calibration result to
                           ; send at matching data rate nop                ; "call Delay" was original code, more
        nop                ; typical, but PIC12C508 has limited
        goto Delay         ; stack so this is more portable. The
                           ; "return" at Delay ends "call BitPort".

StrOut  ; ----------------------------------------------------
        ; Write contents of STRING to serial port OUTPORT ; Input:   STRING is array of bytes to send
        ;          STRLEN is count of bytes to send
```

```
; Output:  None
; Affects: ALPHA, BETA, GAMMA, FSR, W

; -------------------------------------------------------
; Verify that we have a legal STRING to send movf STRLEN, F    ; Check that there is ANY string
           btfsc STATUS, Z   ; Execute return if Z
           return            ; ... no string to send.

movlw MAXSTR+1    ; Sanity check: string length legal?
           subwf STRLEN, W   ; strlen <= maxstr
           btfsc STATUS, C   ; If not sane (string overflow)
           return            ; ... exit without action.

; -------------------------------------------------------
; STRING is legal.  We're ready to send it out.

movlw STRING      ; Point at start of string
           movwf FSR         ; with the indirection register clrf GAMMA        ; Counter of bytes sent D_NextByte ; -------------------------------------------------------
           ; Send a byte (indirection register points to it)

incf GAMMA, F     ; Advance count of bytes being sent
           movf INDF, W      ; Get the next byte
           movwf BETA        ; Put it where we can play with it bsf STATUS, C     ; Send 1 to ensure idle level
           call BitPort      ; at serial output port bcf STATUS, C     ; START BIT - symbol equivalent
           call BitPort      ; to data 0.

; Note timing from previous to next "call BitPort"
           ; is exactly 6 instructions, to make start bit the
           ; correct time duration (consistent with loop below)

movlw D'9'        ; Number of bits to send (including
           movwf ALPHA       ; the stop bit) is stored in counter bsf STATUS, C     ; We'll push a stop bit (1) onto
```

```
                            ; BETA, so we send it out at end

D_NextBit       ; -------------------------------------------------
                ; Send out each bit, by rotating them out of BETA rrf BETA, F     ; Get low-order bit (of those left)
                call BitPort    ; Send the bit via serial output port
                decfsz ALPHA, F ; Are we done?
                goto D_NextBit  ; ... if not, keep sending bits nop             ; These 2 instructions finish the
                nop             ; time interval for the stop bit ; -------------------------------------------------
                ; Byte sent.  See if we want to send another byte.

movf GAMMA, W   ; Count of bytes sent
                subwf STRLEN, W ; ... minus bytes want to send
                btfsc STATUS, Z ; If this is non-zero, keep sending
                return          ; ... but if equal, all bytes sent.

; If we want another byte, advance pointer and loop back incf FSR, F     ; Point at next byte in the string
                goto D_NextByte ; Send it out SerIn           ; -------------------------------------------------
                ; Read serial input string from remote serial device ; Input:   W is bitmask for GPIO marking input port
                ;          PIN_HI is logic meaning of a high pin
                ;          (bcf PIN_HI appropriate for BC-780XLT)
                ; Output:  STRING is read characters - length STRLEN
                ; Affects: ALPHA, GAMMA, DELTA, FSR, W movwf DELTA     ; Store mask for GPIO bit selection
                clrf STRLEN     ; No valid string recorded movf DELTA, W       ; Initial check for start bit
                andwf GPIO, W       ; ZF = status of INPORT
                btfss PIN_HI        ; If high pin = 0,
                xorwf DELTA, W      ;    ... flip for true value
```

```
                    btfsc STATUS, Z         ; If start bit in progress ...
                    goto C_RightAway        ;    ... no delay to mid-bit C_Idle              ; Idle level. Sit and watch for duration of 18 bits.
                    ; Function written for dedicated device with few tasks.

movlw D'2'              ; Initialize the outer timeout
                    movwf GAMMA             ; loop counter (2*9 bit lengths)

C_NewByte           ; Come here to watch for a byte to append to STRING.

movf IOCAL, W           ; Number of inner-loops variable
                    movwf ALPHA             ; to keep duration at nine bits C_NBIL              movf DELTA, W           ; Load mask (select right pin)
                    andwf GPIO, W           ; Check INPORT
                    btfss PIN_HI            ; If high pin = 0,
                    xorwf DELTA, W          ;    ... flip for true value btfsc STATUS, Z         ; Start bit?
                    goto C_Detect           ;    ... if so, collect byte.

decfsz ALPHA, F         ; Decrement timeout inner loop
                    goto C_NBIL             ;    ... NewByte Inner Loop.
                    decfsz GAMMA, F         ; Decrement timeout outer loop
                    goto C_NewByte          ;    ... continue if appropriate return                  ; Timeout. Done.

C_Detect            ; ------------------------------------------------
                    ; We come here when a start bit is detected.

; Delay so first sample is exactly a half-bit later.
                    ; Aim for center of each bit interval, so timing
                    ; errors are least likely to corrupt results.

; Input port tested every 9 instructions, so assume
                    ; (on average) detect +4.5 instructions after leading
                    ; edge -- plus five instruction clocks after detection
                    ; so we are now +9.5 instructions after leading edge.

; After we fall through (to C_RightAway) there are 5
                    ; instructions before C_NextBit. Phasing in C_NextBit
                    ; loop places collection of a bit 5 instructions
```

```
                        ; BEFORE the top of loop.  So we want to be exactly
                        ; 1/2 bit after start bit leading edge on last
                        ; instruction before C_RightAway.

bcf STATUS, C    ; Note use of data rate calibration value
                        rrf IOCAL, W     ; Get the instruction count for half-bit
                        movwf ALPHA      ; Excepting "call delay" there are five.
                        movlw D'14'      ; instructions here.  Enter code fragment
                        subwf ALPHA, W   ; near +9.5 so "call Delay" should consume
                        call Delay       ; (IOCAL/2) - 14.5 instruction cycles.

C_RightAway             ; Assume STRLEN is # valid bytes already in STRING.

movlw STRING     ; Point at string
                        addwf STRLEN, W  ; Offset to where this byte goes
                        movwf FSR        ; with indirection register movlw D'9'       ; Counter of number of bits to
                        movwf GAMMA      ; collect -- including stop bit C_NextBit               ; Start collection of next bit ; We store the LAST bit collected (CF to INDF).
                        ; This odd approach lets us use the one-bit timing
                        ; loop to wait until the last data bit has ended,
                        ; exiting during the stop bit, ensuring the last bit
                        ; is not inadvertently read as a start bit in progress.

rrf INDF, F      ; Store last bit collected into result byte
                                         ; (junk CF at entry is rotated out).

; Wait until the next bit movlw D'13'      ; 13 instructions in loop, so IOCAL-13
                        subwf IOCAL, W   ; is correct delay until next bit.
                        call Delay       ; Note use of data rate calibration.

; Copy the data bit into the carry flag bcf STATUS, C    ; Default to CF clear
                        movf DELTA, W    ; Load mask (to select INPORT pin)
                        andwf GPIO, W    ; Test input bit <-- PRIMARY INSTRUCTION
```

```
        btfss PIN_HI    ; If high port logic level = data zero
        xorwf DELTA, W  ;    ... flip the bits btfss STATUS, Z ; CF was defaulted to zero (bcf above)
        bsf STATUS, C   ;    ... so overwrite CF if data = 1

; More bits?

decfsz GAMMA, F ; If there are more bits
        goto C_NextBit  ;    ... go get them ; Adjust STRLEN for byte read from serial port into STRING.

incf STRLEN, F  ; One byte appended to STRING movlw MAXSTR    ; Maximum string length
        subwf STRLEN, W ; Test to see if STRING is full
        btfsc STATUS, Z ; If so ...
        return          ;    exit -- don't record more data.

goto C_Idle     ; Collect more data from serial input

; ------------------------------------------------
        org H'08'       ; Following must be in first 256 bytes
        nop             ; W=7   Preceded by 120 nop's omitted
        return          ; W=6   for brevity.  Must be entirely
        return          ; W=5   in first 256 bytes of code due
        return          ; W=4   to restrictions on computed
        return          ; W=3   program counter.  "call Delay"
        return          ; W=2   takes W instruction cycles ...
Delay   subwf PCL, F    ; (W=1 is very bad.  Don't try it.)
        return          ; W=0   ... including call/return.
```

Operation of the Invention

The present invention may be used by a receiving device, microprocessor 10, to determine the apparent data rate of an asynchronous serial data communication generated by a sending device, remote serial device 20. As illustrated for a typical binary sequence in FIG. 2, this is achieved by measuring calibration time interval 40 between start bit leading edge 30 and marker transition 34 at the end of a subsequent data symbol in a predetermined data pattern. This timing measurement is then used to calibrate asynchronous serial communications means for subsequent asynchronous serial data communications at the observed data rate. Once calibrated, microprocessor 10 may then conduct serial communications at the data rate matching the data rate used by remote serial device 20, ensuring correct communications.

Since microprocessor 10 mimics the data rate of remote serial device 20, one or both devices may employ an imprecise timing reference. When microprocessor 10 employs an imprecise timing reference, as in the present embodiment, the apparent data rate observed by microprocessor 10 may not equal the true data rate. The apparent data rate is sufficient and preferred for enabling microprocessor 10 to conduct subsequent serial communications, since the apparent data rate may be matched by microprocessor 10 in subsequent asynchronous serial communications, matching the actual data rate employed by remote serial device 20.

Predetermined Data Pattern

Figure 2:
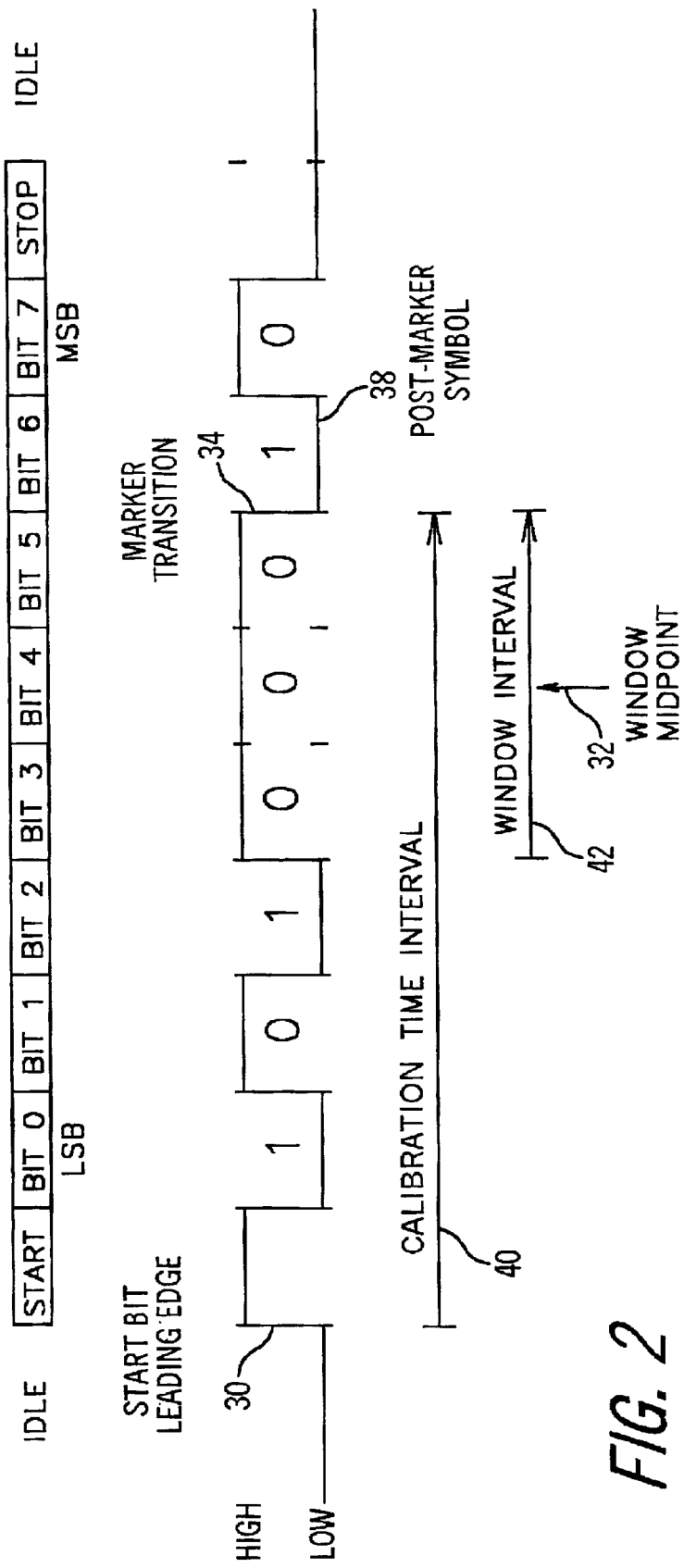
FIG. 2 is a graph of an expected predetermined data pattern waveform, in an exemplary embodiment of the invention.

The implementation of the preferred embodiment depends upon the data patterns expected from remote serial device 20, and the conditions under which these patterns are transmitted, in ways that are apparent to a person of ordinary skill in the art. The exemplary Uniden BC-780XLT remote serial device 20 uses asynchronous serial communications for control and status reporting, and responds to an unintelligible command, such as a single carriage return (binary sequence "00001101"), with the predetermined data "ERR" (error) represented as a standard ASCII binary sequence. FIG. 2 is a graph of this expected predetermined data pattern waveform from remote serial device 20, in an exemplary embodiment of the invention, showing a binary representation of the initial "E" and the idle level immediately before this binary sequence. Symbol changes within this binary pattern are evident to microprocessor 10 as changes in the level of an input port connected to communications link 14.

The predetermined data pattern utilized by the present invention is characterized by specific features of the data pattern illustrated in FIG. 2. Specifically, any pattern includes the predetermined data pattern if it includes a recognizable marker transition 34 between symbol values, where calibration time interval 40 (from start bit leading edge 30 to marker transition 34) contains a fixed and predetermined number of data symbols (including the start bit data symbol). In the preferred embodiment, it is further required that a predetermined number of data symbols, immediately preceding marker transition 34 and corresponding to window interval 42, be represented with symbol(s) different from postmarker symbol 38 immediately following marker transition 34. Alternative embodiments may not include this additional requirement, as discussed in a later section.

In this embodiment, data symbols before or after window interval 42 (if any) have no effect upon the operation of the present invention, with the single exception that postmarker symbol 38 must not appear within window interval 42. Accordingly, a plurality of data patterns may include the same predetermined data pattern. For example, the exemplary source code in FIG. 4 will calibrate correctly in response to the ASCII binary representation of any capital letter from "A" through "G", including "E". All seven letters have an identical binary pattern in bits 3 through 6, the section of data corresponding to window interval 42 and postmarker symbol 38 in the exemplary source code shown in the detailed description. Therefore, the binary patterns representing all seven letters include the predetermined data pattern utilized by the preferred embodiment. For certain sets of expected data patterns, this characteristic of proper calibration to a variety of data patterns may be employed if it is uncertain exactly what data pattern will be transmitted by remote serial device 20. Window interval 42 and marker transition 34 may be selected to ensure that any expected data sequence qualifies as a predetermined data pattern.

General Concepts

The exemplary asynchronous serial communications source code presented in the detailed description accepts a calibration parameter measured as the number of microprocessor 10 instruction cycles executed over the duration on a single bit, at the data rate used in the asynchronous serial data communications. This parameter is determined by counting blocks of seven executed instructions over an interval corresponding to seven bits, calibration time interval 40, transmitted by remote serial device 20 in the asynchronous serial data communications. The number of seven-instruction blocks executed over seven bits of equal duration is clearly identical to the number of single instructions executed over a single bit.

The process described below for detecting start bit leading edge 30 and marker transition 34, and measuring calibration time interval 40 between these transitions, is a preferred but not exclusive process since various mathematically equivalent alternatives may be used to achieve the same end.

In the preferred embodiment, the exemplary Uniden BC-780XLT remote serial device 20 uses the RS-232 protocol for asynchronous serial communications. The BC-780XLT correctly interprets logic level data, but provides output data at levels (+12 V and −12 V) that could damage the microprocessor. Level converter 16 clamps the positive level to +5 V, while diodes within the exemplary PIC12C508 communications port clamp the negative level to ground, thereby converting the RS-232 BC-780XLT output levels to logic levels.

Sequence of Operations

Figure 3:
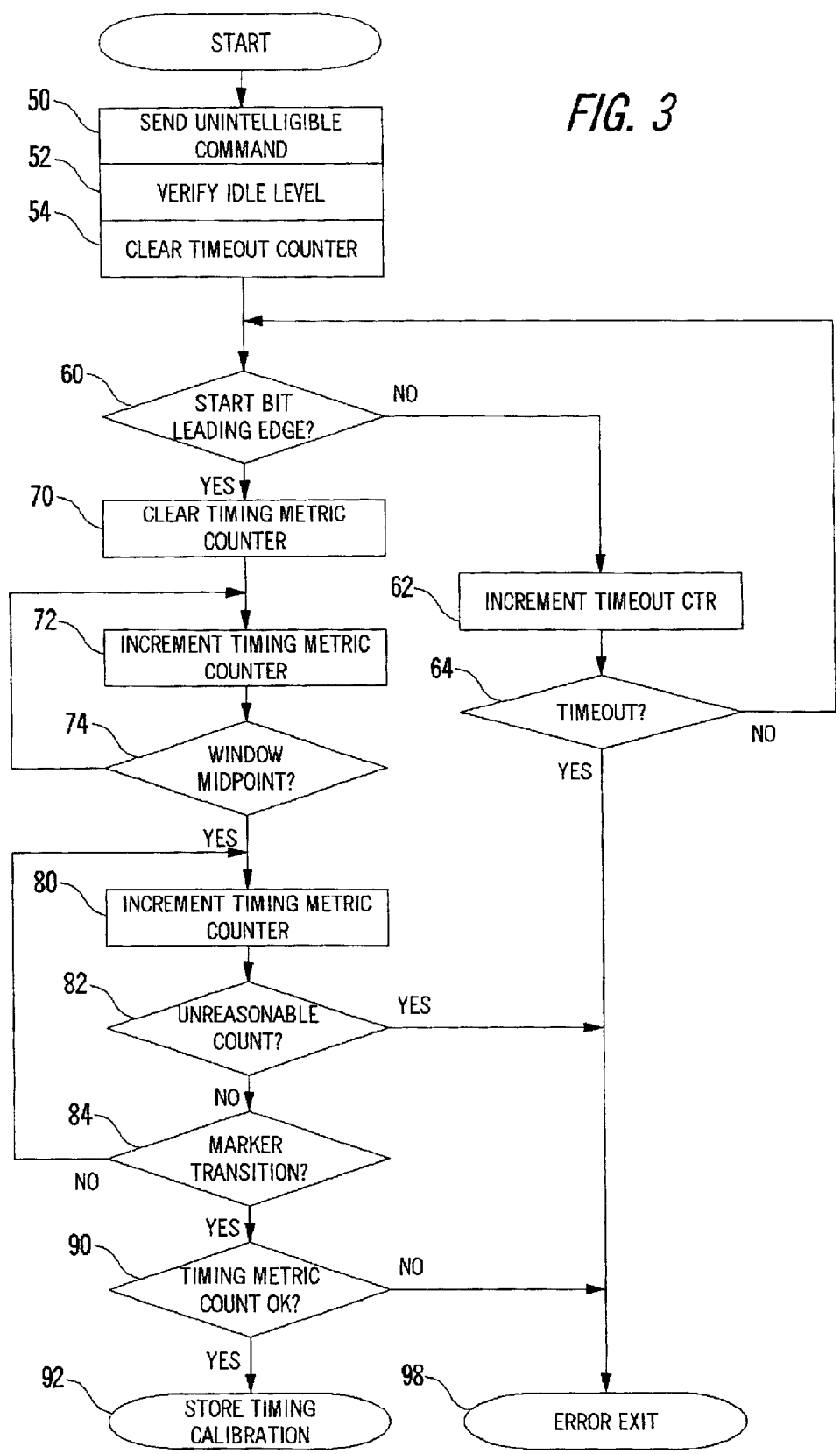
FIG. 3 is a flowchart of the operation of the invention, in a preferred embodiment of the invention.

FIG. 3 shows a flowchart of the operation of the invention, in a preferred embodiment of the invention. This embodiment calibrates a timing parameter indicating the apparent data rate, expressed as the apparent time interval used by remote serial device 20 to transmit a single symbol, measured in units of microprocessor 10 instruction cycles.

At step 50, an unintelligible command is sent from microprocessor 10 to remote serial device 20. As indicated above, the Uniden BC-780XLT responds to an unintelligible command by sending an ASCII "E" (binary "01000101") over communications link 12.

At step 52, communications line 14 is checked to ensure that its initial level is consistent with the idle state expected between sequences of binary symbols. Then, in step 54, a timeout counter is cleared. The check of step 52, and the use of the timeout counter referenced in step 54, are optional elements that reduce the risk of errors.

At step 60, communications line 14 is monitored to check for start bit leading edge 30, which is indicated by the first appearance of the data level opposite the idle level. If start bit leading edge 30 is detected, the process moves to step 70. Otherwise, the timeout counter is advanced at step 62, and tested for expiration at step 64. Normally the process returns to step 60 while waiting for the start bit leading edge, but if the timeout counter expired, the process terminates with an error exit at step 98 without a successful calibration because the expected response "E" was not seen.

Upon detecting start bit leading edge 30 at step 60, a timing metric counter is cleared at step 70. This counter will measure the apparent length of calibration time interval 40 between start bit leading edge 30 and marker transition 34. Then the process enters a delay loop, alternately advancing the timing metric counter at step 72 and checking this counter at step 74 against a predetermined exit value, until the counter equals the exit value. Loop exit must occur at a time during window interval 42. The approximate delay time should be targeted for exit near window midpoint 32 based upon a pre-calibration estimate of the expected data rate, to minimize the risk that a large timing difference between the expected and actual apparent data rate could bring loop exit outside window interval 42.

When this delay loop exits at approximately window midpoint 32, the process begins watching for marker transition 34. The timing metric counter is advanced at step 80, as it continues to accumulate a measure of calibration time interval 40 between start bit leading edge 30 and marker transition 34. Step 82 compares this counter to an unreasonable value, and if equal terminates with an error exit at step 98 without a successful calibration because marker transition 34 was not seen. At step 84, communications line 14 is monitored to check for marker transition 34, which is indicated by the first appearance of postmarker symbol 38, the data level opposite that present at window midpoint 32. If marker transition 34 is not seen, the process reverts to step 80.

When marker transition 34 is detected at step 84, the process checks the timing metric counter at step 90 to confirm that the value is reasonable. If the value is unreasonable, an error exit termination is made to step 98. This step is different from the check of step 82 because computation time may be limited during the critical timing loop of steps 80 through 84, and so a more careful check may be made at step 90. The sanity checks of steps 82 and 90 are optional elements that reduce the risk of errors.

To complete the process, at step 92, the timing metric counter is stored for subsequent use by the asynchronous serial communications input/output software of microprocessor 10. If asynchronous serial communications means are employed that require a timing parameter expressed in different units, the timing metric counter may be mathematically converted to the desired units.

With the asynchronous serial communications means calibrated to match the data rate of remote serial device 20, microprocessor 10 may subsequently receive data transmitted by remote serial device 20 over communications link 18 and store such data for subsequent processing, and/or transmit asynchronous serial communications to remote serial device 20 over communications link 12 at a data rate required by remote serial device 20.

Adaptation to Similar Data Patterns

A person of ordinary skill in the art may adapt the exemplary source code presented in the detailed description to work with data patterns other than the "A" through "G" range, data rates besides approximately 9600 baud, and/or microprocessor 10 clock speeds other than the PIC12C508 RC oscillator default. Changes in window midpoint 32, the estimated data rate, and/or the clock speed of microprocessor 10, may be accommodated with a different predetermined exit value in step 74. A different idle state level can be accommodated with a change in the level tests of steps 52 and 60. A different postmarker symbol can be accommodated with a change in the level test of step 84.

It is desirable to select a marker transition 34 near the end of the transmitted pattern, since a longer calibration time interval 40 provides greater accuracy in the data rate calibration. Further, it is desirable to maximize the length of window interval 42 because this provides for a greater data rate capture range about a pre-calibration estimate used to estimate the time of window midpoint 32. If the designer can determine the data pattern sent by the remote serial device 20, a preferred pattern optimizing these factors would be the standard ASCII binary sequence corresponding to a capital "A".

Alternative Embodiments of the Invention

Figure 4:
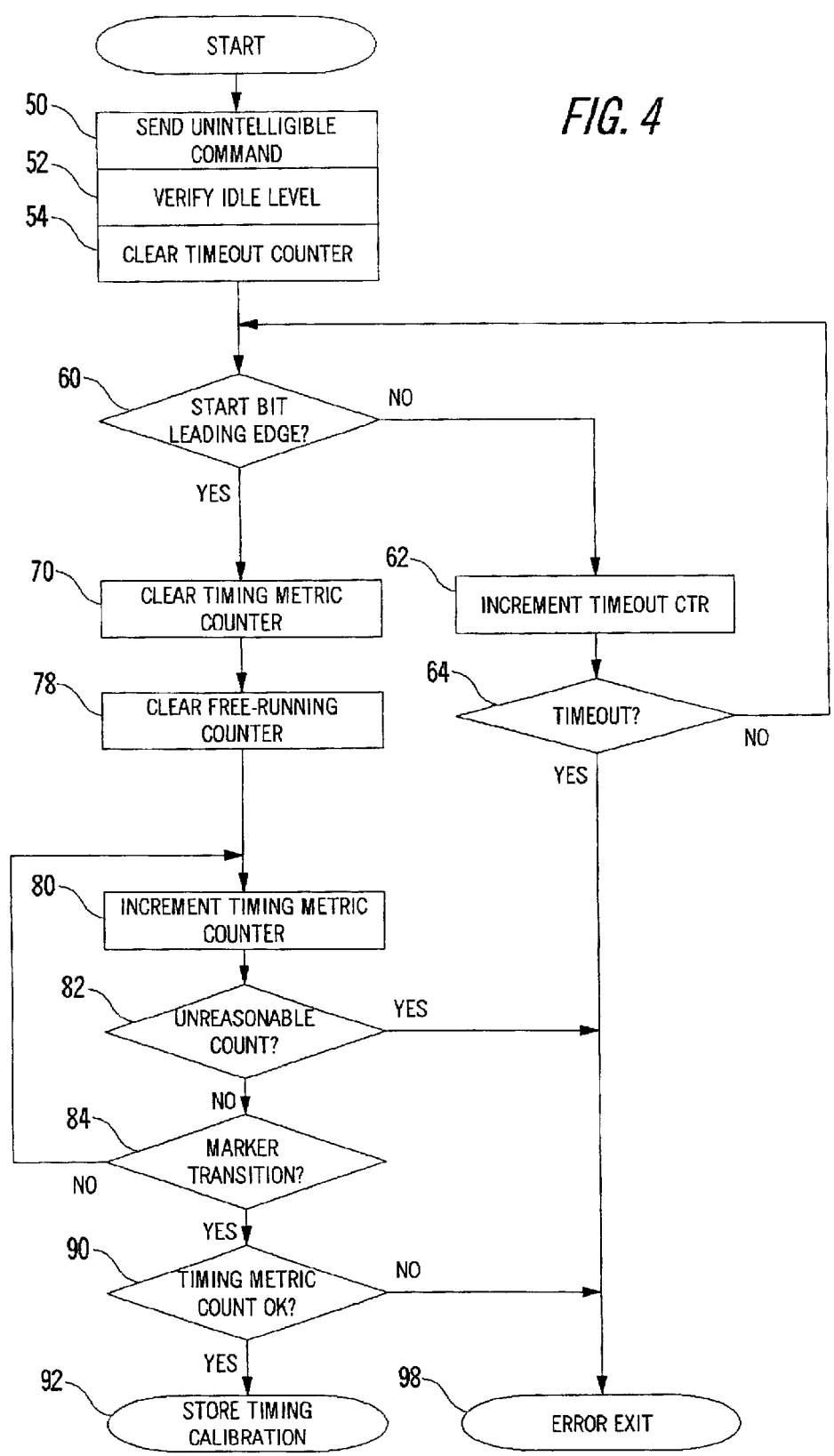
FIG. 4 is a flowchart of the operation of the invention, in an alternative embodiment of the invention.

In an alternative embodiment, marker transition 34 is detected by counting all symbol value transitions during calibration time interval 40, following start bit leading edge 30 until a predetermined count is reached indicating marker transition 34. A flowchart of this process is shown in FIG. 4, with the difference from FIG. 3 that steps 72 and 74 are replaced with a new step 78 that clears a free-running counter configured to automatically increment for every high-to-low transition on the input port connected to communications line 14. In the exemplary PIC12C508, the special-purpose TMR0 register may be used as this free-running counter. Then, the marker transition detection at step 84 is implemented by comparing the free-running counter to a predefined value. If equal, the marker transition has just occurred, and the loop exits normally to step 90.

In this embodiment, the predetermined data pattern used to detect marker transition 34 comprises a data symbol representing a start bit, and a data sequence over calibration time interval 40. This data sequence comprises a predetermined number of data symbols ("bits" in a two-symbol datastream), with a predetermined number of transitions between data symbol values within this sequence. The transitions between symbol values may occur between any symbol positions, provided that marker transition 34 falls a predetermined number of symbol positions after the start bit. Thus, the sequences "100101" and "101101" are equivalent predetermined data patterns for the purpose of this embodiment. Depending on the specific sequence, the free-running counter may be configured to detect high-to-low or low-to-high transitions, or both types.

Since window interval 42 is not used in this embodiment, no pre-calibration estimate of the data rate is required. In contrast, the preferred embodiment requires such an estimate to ensure that the loop of steps 72 and 74 terminates during window interval 42. This difference permits the use of the present invention in circumstances where the order of magnitude of the expected data rate is unknown, including traditional autobaud applications. However, many low-end microprocessors do not contain a free-running timer such as TMR0, so this method imposes restrictions on the choice of microprocessor.

In another alternative embodiment, marker transition 34 is detected by counting all symbol value transitions during calibration time interval 40, following start bit leading edge 30 until a predetermined count is reached indicating marker transition 34. Transitions are detected by a hardware interrupt triggered by a change on the input port of microprocessor 10 connected to communications line 14.

In another alternative embodiment, marker transition 34 is detected by counting all symbol value transitions during calibration time interval 40, following start bit leading edge 30 until a predetermined count is reached indicating marker transition 34. Transitions are detected in a loop, by comparing the present value of communications line 14 to a previous value stored in memory, and storing that present value for comparison as the previous value in the next iteration.

In another alternative embodiment, which may be used with data formats employing more than two data symbols, marker transition 34 is detected by locating a symbol immediately preceding marker transition 34 that does not appear elsewhere in window interval 42, and then detecting the symbol change to a different postmarker symbol 38 at marker transition 34.

In another alternative embodiment, the apparent data rate is determined periodically to compensate for drift in device clock rates. Such recalibration may be performed at regular time intervals, or immediately prior to a communications exchange, depending on the circumstance of calibration opportunities and the nature of the clock instability. This is particularly useful if the unstable clock is an RC oscillator that may be exposed to large changes in temperature, because RC oscillators are known to have a frequency of oscillation that is dependent on temperature.

In another alternative embodiment, an action other than sending an unintelligible command is employed to trigger a predetermined data pattern. The specific action appropriate depends upon the specific external device employed, but may be a specific binary sequence, a change in a logic level provided to the external device, or other similar action.

In another alternative embodiment, it is assumed that the sending device will periodically transmit a predetermined data pattern, and microprocessor 10 makes no attempt to trigger such a sequence. With the trigger step omitted, the calibration process begins with a detection of a start bit leading edge at step 60, and the timeout counter will probably be omitted. Microprocessor 10 may watch for such a start bit leading edge at all times, or only at times when a predetermined data pattern is expected, depending on the characteristics of remote serial device 20.

In another alternative embodiment, the timing metric counter is replaced by a free-running counter, which is automatically advanced at regular intervals. This permits a more accurate measurement of the interval, but imposes restrictions in the choice of microprocessor because not all designs include such free-running counters.

In another alternative embodiment, the loop of steps 80 through 84 is replaced with an unrolled loop, in which the software code comprises a series of conditional jumps. The specific jump executed depends upon the exact length of calibration time interval 40 between the leading edge of the start bit 30 and marker transition 34. This provides for a more accurate measurement of the interval, but requires a significantly longer sequence of process instructions.

In another alternative embodiment, marker transition 34 is detected by a hardware interrupt triggered by a change on the input port of microprocessor 10 connected to communications line 14. This provides for a more accurate measurement of the interval, but requires careful coordination with other operations involving interrupts.

In another alternative embodiment, start bit leading edge 30 is detected by a hardware interrupt triggered by a change on the input port of microprocessor 10 connected to communications line 14. This provides for a background detection of incoming data transmissions from remote serial device 20, but requires careful coordination with other operations involving interrupts.

In another alternative embodiment, the accurate calibration of the asynchronous serial communications means is verified by the correct reception of subsequent data.

In another alternative embodiment, microprocessor 10 provides a data rate calibration parameter to dedicated asynchronous serial data communications hardware.

In another alternative embodiment, microprocessor 10 obtains a clock from an off-chip electrical circuit, such as an RC oscillator, crystal oscillator, or similar device.

In another alternative embodiment, remote serial device 20 obtains a clock from an imprecise timing reference.

In another alternative embodiment, microprocessor 10 obtains a clock from an imprecise timing reference, and uses a predetermined data pattern from remote serial device 20 with a precision timing reference to calibrate asynchronous serial communications means for subsequent communications with other devices.

In another alternative embodiment, microprocessor 10 and remote serial device 20 each obtain clocks from imprecise timing references.

In another alternative embodiment, microprocessor 10 is the central processing unit of a standard PC computer, and remote serial device 20 is a computer accessory attached to the computer serial port.

In another alternative embodiment, the predetermined data pattern is transmitted by remote serial device 20 prior to any other communication sequence sent by remote serial device 20.

In another alternative embodiment, the predetermined data pattern is transmitted by remote serial device 20 at the start of a communication sequence sent by remote serial device 20.

In another alternative embodiment, the predetermined data pattern is transmitted by remote serial device 20 at the start of any communication sequence sent by remote serial device 20.

In another alternative embodiment, the predetermined data pattern is transmitted by remote serial device 20 at regular intervals, irrespective of any actions by microprocessor 10.

In another alternative embodiment, a level converter is inserted in communications link 12, for the purpose of converting a logic level data signal to a level expected by remote serial device 20, such as in a non-limiting example RS-232 levels with a wider voltage range.

In another alternative embodiment, level converter 16 is omitted, and communications links 14 and 18 are directly connected.

In another alternative embodiment, communications links 14 and 18 include wireless electromagnetic transmission systems such as optoisolators, or electromagnetic transmitter/receiver pairs operating at radio frequency, microwave, or infrared portions of the electromagnetic spectrum.

In another alternative embodiment, communications link 12 is omitted, and microprocessor 10 partakes in one-way receive-only communications from remote serial device 20.

In another alternative embodiment, remote serial device 20 is an element of a communications system broadcasting asynchronous serial communications over a radio signal. Microprocessor 10 does not participate in the communications system in any manner except as a passive observer of the asynchronous serial communications broadcast over the radio signal.

In another alternative embodiment, useful if remote serial device 20 must receive a specific data sequence at nearly the correct data rate to trigger a response including the predetermined data pattern, microprocessor 10 executes the calibration process iteratively for different estimated data rates until a successful calibration is achieved.

In another alternative embodiment, the asynchronous serial communications means comprise dedicated asynchronous serial data communications hardware accepting a timing calibration parameter.

In another alternative embodiment, the asynchronous serial communications means comprise dedicated asynchronous serial data communications hardware, including a baudrate generator and/or a universal asynchronous receiver transmitter ("UART").

In another alternative embodiment, microprocessor 10 obtains instructions from a read-only memory ("ROM") or random-access memory ("RAM") implemented separately from microprocessor 10 and connected to microprocessor 10 via a data bus.

In another alternative embodiment, microprocessor 10 is an element of digital signal processing ("DSP"), very large scale integration ("VLSI"), and/or application specific integrated circuit ("ASIC") hardware devices.

Ramifications and Scope

Accordingly, the reader will see that the timing calibration technique of the present invention enables accurate serial data communications between devices without the need for precision timing devices, and enables accurate serial communications between devices without a predetermined data rate known to all participating devices. Further, this technique is simple and efficient, requiring only a small amount of program code. Since it does not require any sophisticated microprocessor elements in its simplest embodiments, such as baud rate generators, free-running timers, or hardware interrupts, it can be implemented on even the simplest microprocessors. Since it determines the time interval of a bit by measuring the time interval across multiple bits, it can be employed for higher data rates or slower microprocessors than prior art techniques that determine baud rate from measuring the start bit alone.

While the above description includes many specificities, these should not be construed as limitations on the scope of the invention, but rather as an exemplification of one preferred embodiment thereof. The variants presented in the alternative embodiments, as well as the elements mentioned in the dependent claims, may be combined in various combinations obvious to a person with ordinary skill in the art, in light of the concepts described and suggested herein, and such variants are intended to fall within the scope of the present invention. Many other variations are also possible. For example, the technique could be employed a microprocessor that has a precision timing reference, but receives one-way telemetry from a simple external device that lacks a precision timing reference, where said external device begins every data packet with a known unit identifier. Accordingly, the scope of the invention should be determined not by the embodiments illustrated, but by the appended claims and their legal equivalents.

I claim:

1. A method for matching an apparent data rate of an asynchronous serial data communication, comprising the steps of
    a) detecting a start bit leading edge preceding a predetermined data pattern;
    b) detecting a marker transition at the end of a subsequent data symbol by detecting the first appearance of a postmarker symbol after an approximate delay time has elapsed following said start bit leading edge;
    c) determining a measured calibration time interval between said start bit leading edge and said marker transition, indicating said apparent data rate;
    d) determining a calibration parameter for an asynchronous serial communications means, for bringing the data rate of communications conducted thereby to about said apparent data rate, and
    e) providing said calibration parameter to said asynchronous serial communications means,
whereby said asynchronous serial communications means are calibrated for subsequent asynchronous serial data communications.

2. The method of claim 1, wherein said predetermined data pattern includes a data symbol representing a start bit, a predetermined number of data symbols including a window interval, and a subsequent symbol immediately following said window interval with a value different from each symbol within said window interval, and wherein the end of said delay time occurs during the reception of said window interval, and said window interval is entirely within said calibration time interval.

3. The method of claim 1, wherein a device participating in said asynchronous serial communications includes a timing reference with a clock rate error of greater than five percent, and said clock rate error produces a proportional error in said apparent data rate.

4. The method of claim 1, wherein an expected data rate is known to the device determining said calibration parameter prior to calibration, and said apparent data rate differs from said expected data rate substantially in proportion to timing reference clock rate error.

5. The method of claim 1, wherein said predetermined data pattern is transmitted in response to an action of the device determining the apparent data rate.

6. A method for matching an apparent data rate of an asynchronous serial data communication, comprising the steps of
    a) detecting a start bit leading edge preceding a predetermined data pattern comprising a data symbol representing a start bit, and a data sequence over a calibration time interval comprising a predetermined number of data symbols, with a predetermined number of transitions between different data symbol values within said data sequence;
    b) detecting a marker transition at the end of a subsequent data symbol;
    c) determining a measured calibration time interval between said start bit leading edge and said marker transition, indicating said apparent data rate;
    d) determining a calibration parameter for an asynchronous serial communications means, for bringing the data rate of communications conducted thereby to about said apparent data rate, and
    e) providing said calibration parameter to said asynchronous serial communications means, whereby said asynchronous serial communications means are calibrated for subsequent asynchronous serial data communications.

7. The method of claim 6, wherein said marker transition is detected by counting symbol transitions after said start bit leading edge, until a predetermined count is reached.

8. The method of claim 6, wherein a device participating in said asynchronous serial communications includes a timing reference with a clock rate error of greater than five percent, and said clock rate error produces a proportional error in said apparent data rate.

9. The method of claim 8, wherein the device including a timing reference with a clock rate error of greater than five percent is the device determining said calibration parameter.

10. The method of claim 8, wherein the device including a timing reference with a clock rate error of greater than five percent is the device transmitting said predetermined data pattern.

11. The method of claim 6, wherein an expected data rate is known to the device determining said calibration parameter prior to calibration, and said apparent data rate differs from said expected data rate substantially in proportion to timing reference clock rate error.

12. The method of claim 6, wherein said predetermined data pattern is transmitted in response to an action of the device determining the apparent data rate.

13. The method of claim 6, wherein said data pattern includes at least one transition between different data symbols between said start bit leading edge and said marker transition.

14. A method for matching an apparent data rate of an asynchronous serial data communication, comprising the steps of a) detecting a start bit leading edge preceding a predetermined data pattern;

b) detecting a marker transition at the end of a subsequent data symbol;

c) determining a measured calibration time interval between said start bit leading edge and said marker transition, indicating said apparent data rate;

d) determining a calibration parameter for an asynchronous serial communications means, for bringing the data rate of communications conducted thereby to about said apparent data rate;

e) providing said calibration parameter to said asynchronous serial communications means, and f) verifying the calibration of said asynchronous communications means by the correct reception of subsequent data, whereby said asynchronous serial communications means are calibrated for subsequent asynchronous serial data communications.

15. The method of claim 14, wherein a device participating in said asynchronous serial communications includes a timing reference with a clock rate error of greater than five percent, and said clock rate error produces a proportional error in said apparent data rate.

16. The method of claim 14, wherein an expected data rate is known to the device determining said calibration parameter prior to calibration, and said apparent data rate differs from said expected data rate substantially in proportion to timing reference clock rate error.

17. The method of claim 14, wherein said predetermined data pattern is transmitted in response to an action of the device determining the apparent data rate.

18. The method of claim 14, wherein said data pattern includes at least one transition between different data symbols between said start bit leading edge and said marker transition.

19. The method of claim 14, wherein said marker transition is detected by waiting an approximate delay time following said start bit leading edge, and then counting symbol transitions until a predetermined count is reached.

20. The method of claim 14, wherein said marker transition is detected by counting symbol transitions after said start bit leading edge, until a predetermined count one is reached.

* * * * *